Figure 3:
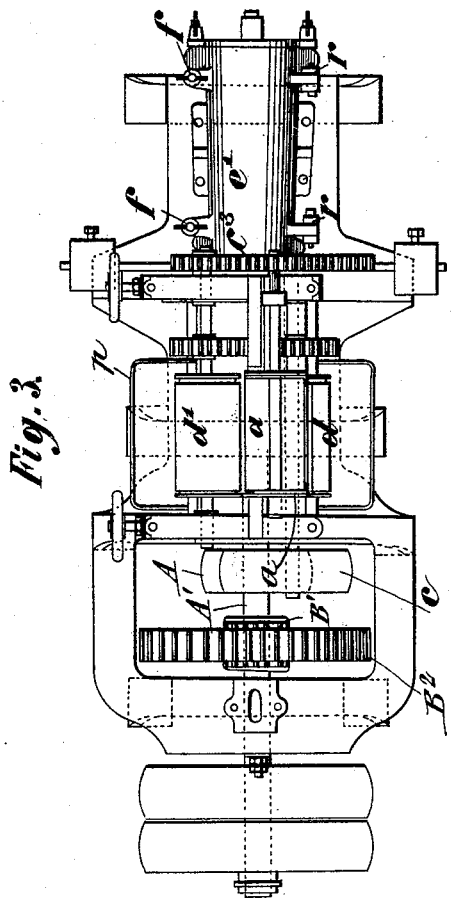

(No Model.) 3 Sheets—Sheet 1.
F. I. GELINCK.
PROCESS OF AND APPARATUS FOR THE PRODUCTION OF DOUGH FROM CEREALS.
No. 523,116. Patented July 17, 1894.
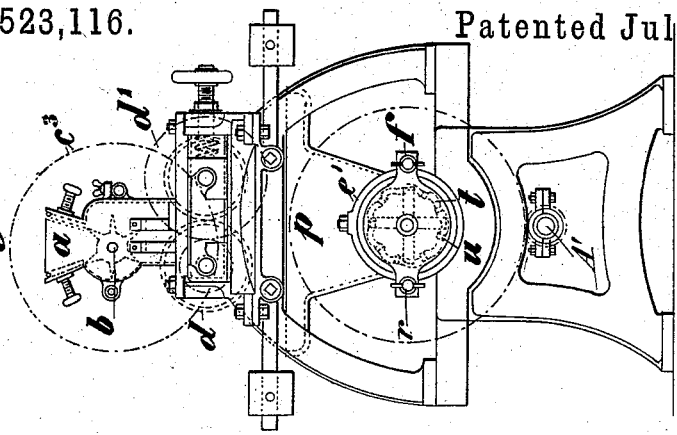
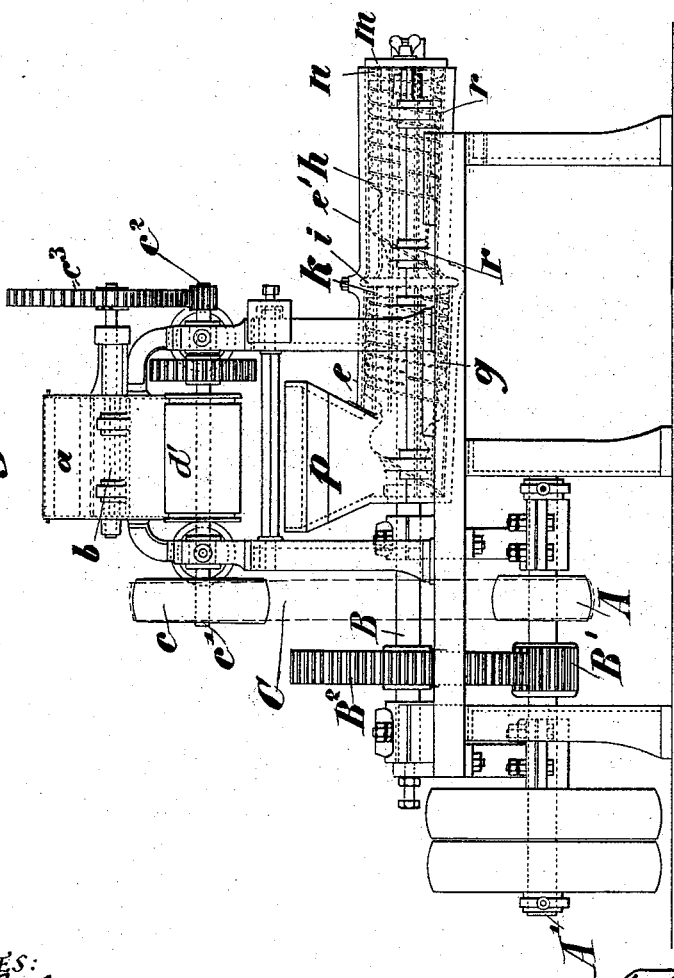

(No Model.) 3 Sheets—Sheet 2.
F. I. GELINCK.
PROCESS OF AND APPARATUS FOR THE PRODUCTION OF DOUGH FROM CEREALS.

No. 523,116. Patented July 17, 1894.

(No Model.) 3 Sheets—Sheet 3.
F. I. GELINCK.
PROCESS OF AND APPARATUS FOR THE PRODUCTION OF DOUGH FROM CEREALS.
No. 523,116. Patented July 17, 1894.
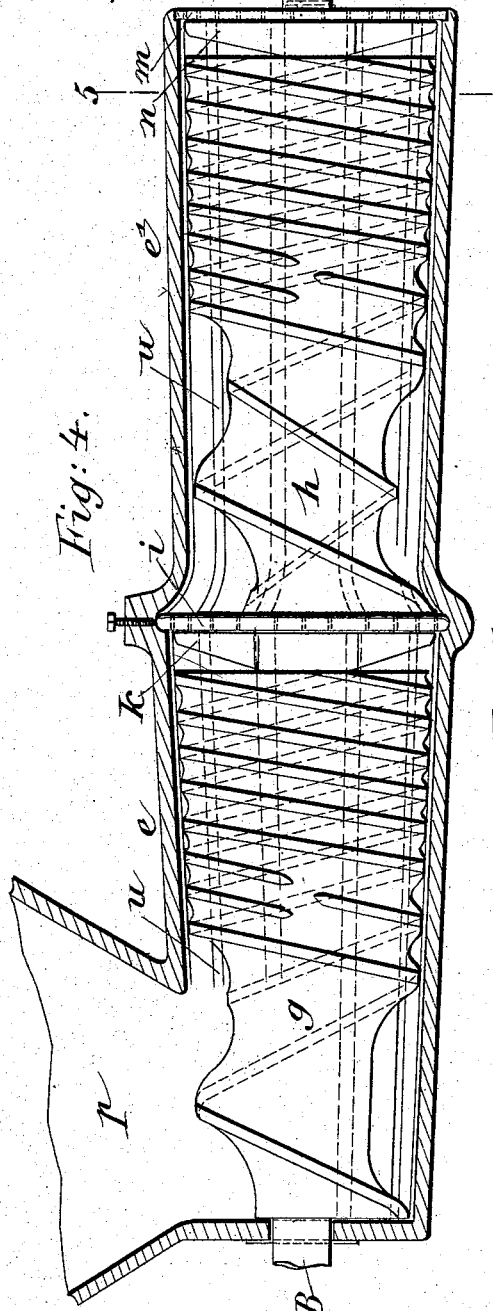
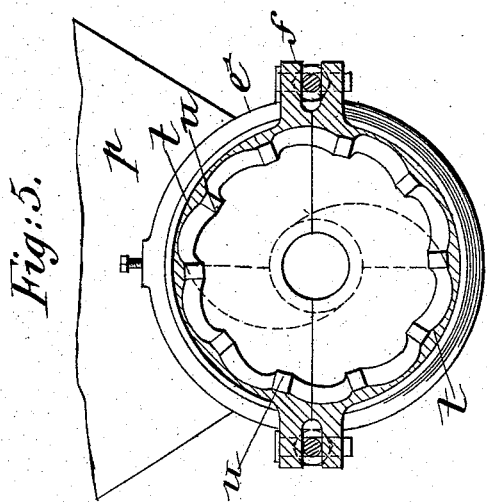
WITNESSES:
INVENTOR
Ferd. I. Gelinck
BY
ATTORNEYS.

UNITED STATES PATENT OFFICE.

FERDINAND IWANOWITSCH GELINCK, OF RIGA, RUSSIA.

PROCESS OF AND APPARATUS FOR THE PRODUCTION OF DOUGH FROM CEREALS.

SPECIFICATION forming part of Letters Patent No. 523,116, dated July 17, 1894.

Application filed December 29, 1893. Serial No. 495,094. (No model.)

*To all whom it may concern:*

Be it known that I, FERDINAND IWANOWITSCH GELINCK, a subject of the Emperor of Russia, residing at Riga, in the Russian Empire, have invented certain new and useful Improvements in Processes of and Apparatus for the Production of Dough from Cereals, of which the following is a specification.

This invention relates, first, to a process for enabling dough to be produced directly from grain or other cereals, thus obviating the necessity for first converting the grain into flour, while at the same time insuring that every part of the grain treated is turned to account, there remaining in the dough no pieces that are not properly crushed or reduced; and, secondly, it refers to apparatus adapted for use in carrying out such process.

According to my improved process, the grain, after being washed and freed from all impurities, is steeped in water at a temperature of 50° centigrade for an hour and a half, and is then conveyed, in predetermined quantities, to a pair of rollers to be crushed. The crushed mass is thence conducted into a ribbed casing of peculiar shape, in the interior of which a conveyer-screw or worm rotates. By means of the screw-thread and the ribs of the casing, the crushed mass is further reduced, any pieces which may have escaped crushing being cut up by rotating knives. The whole of the material is then forced through a perforated plate or screen into another similar casing or compartment, where it is still further reduced by a screw-thread of somewhat different shape. It is next forced through a finer screen or plate with smaller perforations, any pieces that still require dividing being again cut up by knives. Such parts as are too large to pass through the second sieve are conducted back, owing to the peculiar shape of the casing and screw, and once more undergo the reducing process in the second casing or cylinder, the operation being repeated until the required degree of fineness is attained, when the dough is ready for use.

Apparatus whereby my improved process may be carried out is illustrated in the accompanying drawings, wherein—

Figure 1 is a side elevation. Fig. 2 is an end elevation, and Fig. 3 is a plan. Fig. 4 is a vertical longitudinal section through the casing of the apparatus, and Fig. 5 is a section on line 5, 5, of Fig. 5, the interior parts being removed.

Similar letters of reference indicate like parts throughout the drawings.

The grain, after having been washed and steeped as above described, is placed in the hopper $a$ and fed in suitable quantities to the crushing rollers $d$, $d'$, by means of a roller $b$, which is star-shaped in cross-section and driven from the pulley $c$ through the medium of shaft $c'$, pinion $c^2$, and toothed wheel $c^3$. The shaft $c'$ is rotated by means of a belt C passing over its pulley $c$ from a pulley A on the main-drive shaft $A'$ of the apparatus. The crushed grain falls into the hopper $p$, which conducts the pulpy mass into the receptacle or casing $e$, $e'$. The casing is divided longitudinally into two longitudinal semi-sections, so that it may be opened for the purpose of cleaning it; the semi-sections being connected at one side by hinges $r$ and on the other side by clamps $f$, whereby they can be held securely closed. The casing is, moreover, divided about midway of its length by a perforated plate or screen $i$ into two compartments $e$ and $e'$ respectively. The inner surface of the casing is provided with longitudinal projections or beads $t$, which develop into flattened ribs $u$, (Fig. 2.) $g$ and $h$ are the conveyer-screws fixed on intermediate shaft B, which is driven by the shaft $A'$ through gears $B'$, $B^2$, and the threads of which conveyer-screws turn quite close to the ribs $u$. The shape of the threads of these screws has by experiment been so determined as to enable them to tear asunder the grain or other cereals sent through the compartments, and crush it between their flat surfaces and the ribs of the compartments. By means of the worm or screw $g$ the mass is moved up to the perforated plate $i$. After being cut up by the knives or cutters $k$, it is forced through the perforations in the plate $i$, into the second compartment $e'$. The interior of this compartment is similar to the first, but the worm $h$ which rotates therein has a screw-thread somewhat different from that of the worm $g$, it being adapted, first, to scrape off the plate or screen $i$, the pulpy mass issuing through its meshes, and then, while pressing it with considerable force against the walls of the compartment $e'$, to convey it to a second screen or perforated plate $m$, the meshes or perforations of which are smaller than those of the screen $i$. After such parts of the dough as may still need reducing have been cut up by the knives $n$, the material is forced through the screen $m$. Such pieces of dough as may still be too large to pass through either the screen $i$ or $m$ are conducted back in the grooves between the ribs $u$ and caused again to undergo the reducing process between the worm $g$ or $h$, as the case may be, and the ribs $u$, and this action is repeated as many times as may be necessary to divide the material into particles sufficiently fine or minute to pass through the screen $i$ or $m$, from which latter the mass issues in the condition of dough which is ready to be kneaded in a suitable apparatus and then made into loaves. When the grooves in the casing and in the worms are full of the material it will be clear that the coarser material not forced through either screen will have to make room for the advancing material, and so it is carried back in the grooves by the pressure of the material being advanced in the grooves of the worm and will thus be caused to undergo a renewed crushing action.

The bread which is produced from dough prepared in this manner keeps fresh much longer than bread made by the ordinary method, in addition to which its taste and flavor are improved, owing to the fact that the grain employed, being first carefully cleaned and washed, is absolutely free from impurities.

The machine above described may be operated through a hand-wheel, by animal power, or by a steam or other motor engine, and is specially adapted for use in campaigns, or in expeditions in places where it is easier to procure grain than flour, the latter article, which is liable to decay and adulteration being by this invention rendered quite unnecessary.

Having thus described my invention, what I claim as new therein, and desire to secure by Letters Patent, is—

1. The process of preparing dough directly from grain, consisting in soaking the grain, crushing the grain, cutting up the coarser particles not crushed, screening the material, and again crushing the unscreened material, substantially as set forth.

2. The process of preparing dough directly from grain, consisting in soaking the grain, preliminarily crushing the grain, then again crushing or reducing the mass, and then separating the finer from the coarser particles, and moving the coarse or unscreened material backward and forward to subject it to repeated crushings, until every part thereof is sufficiently reduced, substantially as set forth.

3. The herein-described apparatus for preparing dough directly from grain, consisting of a casing adapted to receive material, and having beads or projections terminating in flat ribs, a screw or worm in the casing adapted to act conjointly with the ribs to reduce the material, said material being moved backward between the beads or projections and brought forward again by the screw, and a screen attached to the casing and through which the fine material is forced, substantially as set forth.

4. The herein-described apparatus for preparing dough directly from grain, consisting of a casing adapted to receive the material, and having ribs on its inner surface, a rotatable shaft journaled in the casing, two screws or worms in the casing adapted to act jointly with the ribs to reduce the grain, a screen located between the two screws or worms, a cutting knife located close to said screen, a second screen at the end of the casing having finer perforations than the first screen, and a second cutting knife located close to the second screen, said screws and cutters being mounted on said shaft, substantially as set forth.

In testimony that I claim the foregoing as my invention I have signed my name in presence of two subscribing witnesses.

FERDINAND IWANOWITSCH GELINCK.

Witnesses:
ALEXANDER BERGBOHM,
LUDWIG JOHANSON.